(12) United States Patent
Anderson et al.

(10) Patent No.: US 7,197,717 B2
(45) Date of Patent: Mar. 27, 2007

(54) SEAMLESS TABBED FOCUS CONTROL IN ACTIVE CONTENT

(75) Inventors: David R. Anderson, Saratoga, CA (US); Prashant Patel, Fremont, CA (US); Mark A. Kieling, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 709 days.

(21) Appl. No.: 10/164,161

(22) Filed: Jun. 4, 2002

(65) Prior Publication Data

US 2003/0231210 A1  Dec. 18, 2003

(51) Int. Cl.
*G06F 3/00* (2006.01)
(52) U.S. Cl. .................. 715/767; 715/802; 715/821
(58) Field of Classification Search ............ 715/767, 715/802, 821
See application file for complete search history.

(56) References Cited

U.S. PATENT DOCUMENTS

| | | | | |
|---|---|---|---|---|
| 5,916,310 | A | * | 6/1999 | McCain ...................... 710/67 |
| 6,072,485 | A | * | 6/2000 | Barnes et al. ............... 715/802 |
| 6,154,205 | A | * | 11/2000 | Carroll et al. .............. 345/684 |
| 6,211,921 | B1 | * | 4/2001 | Cherian et al. ............. 348/565 |
| 6,262,722 | B1 | * | 7/2001 | Allison et al. ................ 725/39 |
| 6,614,457 | B1 | * | 9/2003 | Sanada et al. .............. 715/840 |
| 6,704,032 | B1 | * | 3/2004 | Falcon et al. ............... 715/746 |
| 6,724,399 | B1 | * | 4/2004 | Katchour et al. ........... 715/740 |
| 6,785,865 | B1 | * | 8/2004 | Cote et al. .................. 715/513 |
| 6,915,491 | B2 | * | 7/2005 | Hsieh ......................... 715/802 |
| 6,918,090 | B2 | * | 7/2005 | Hesmer et al. ............. 715/760 |
| 2004/0210830 | A1 | * | 10/2004 | Cote et al. ................ 715/501.1 |
| 2005/0120388 | A1 | * | 6/2005 | Ten Kate .................... 725/135 |

* cited by examiner

*Primary Examiner*—Sy D. Luu
(74) *Attorney, Agent, or Firm*—Lee & Hayes, PLLC

(57) ABSTRACT

In a visual display system using a tabbed focus, movement of the focus is coordinated seamlessly between container-generated visual content and active content.

71 Claims, 10 Drawing Sheets

SEAMLESS TABBED FOCUS CONTROL IN ACTIVE CONTENT

TECHNICAL FIELD

This application relates to methods of focus movement in systems utilizing a tabbed focus, in situations where displayed content includes active content such as active controls.

BACKGROUND

There is a growing trend to incorporate computer-like functions into television or television-based devices. For example, entertainment devices, typically used with televisions, are now available that combine traditional television programming with interactive content, such as content obtained from the Internet or some other source. When using devices such as these, interactive visual and audio content are often rendered by the television equipment rather than by dedicated computer peripherals.

In the desktop computer environment, substantial attention has been given to designing appropriate methods of user interaction. At the moment, the Windows® desktop family of operating systems, available from Microsoft Corporation, utilizes what seems to be the most popular form of user interface.

The Windows® desktop operating systems emphasize the use of a mouse in conjunction with an on-screen pointer and a plurality of on-screen objects or controls. The mouse can be moved across a flat surface in different directions to produce a corresponding analog and continuous movement of the on-screen pointer. This method of moving a pointer is sometimes referred to as "roaming."

Objects or controls, also referred to as icons, represent functions or items that are available for a user to select. To select an object, the user moves the pointer over the object and depresses or "clicks" a button on the mouse. The operating system responds by performing an appropriate action, depending on the nature of the selected object.

Although this type of user interface works well in the desktop environment, it is not nearly as effective when transferred to the television or home entertainment environment. In this environment, the user is typically sitting on a couch or recliner at some distance from the image displayed by the television. As a further complication, most televisions have much lower display resolutions than typical computer monitors. These factors make it somewhat more difficult to display and position objects and mouse pointers. Additionally, the user's viewing situation often does not lend itself to use of a mouse. Rather, the user is often more comfortable with an IR (infrared) input device with more rudimentary controls such as a set of orthogonal directional keys. Finally, apart from physical constraints, positioning an on-screen pointer simply requires more concentration than a casual user is willing to put forth during a time intended for relaxation or recreation.

And as a result of these factors, many television-related products now use a so-called "tabbing" focus movement model. This model constrains the user's movement to a limited to set of displayed objects. Rather than using a continuously moveable the pointer, a "focus" is moved around the display between different objects. The focus is generally indicated by highlighting or otherwise changing the appearance of the focused object. In some cases, a highlighted frame is positioned around the object that has been assigned the focus.

Generally, one and only one item has the focus at any given time. To select an object, the user moves the focus from object to object using directional keys or some other type of directional control operators. But as opposed to the roaming model discussed above, the focus "tabs," "jumps," or moves abruptly from one focused object to the next. When the focus is on the desired object, the user pushes an "action" key to select the object.

Significant effort has been put into ensuring that the focus responds in expected or predictable ways in response to user inputs. However, so-called "active content" has presented difficulties in this regard.

In the past, visual content has been primarily defined by a text markup language such as HTML (hypertext markup language). An HTML document or specification is read, interpreted, and displayed by a software component such as a browser. The HTML text defines the locations of focusable objects (referred to herein as focus targets), which are often hyperlinks or references to other HTML content.

In this situation, the browser is able to determine the relative locations of the focus targets, and is thus able to tab a focus among those targets in a predictable fashion in response to user directional inputs. The browser is also able to scroll the displayed content as appropriate to ensure the visibility of any focus target that has currently been assigned the focus.

Active content, on the other hand, is generated by a program component other than the browser. In the case of active content, the HTML document contains a reference to a program component that is instantiated and executed to generate a portion of an overall piece of visual content. A program component such as this is referred to herein as an active visual control or an active content component. An ActiveX® control is an example of an active content component. ActiveX® controls can be written in a variety of different programming languages, such as C, C+, and Visual Basic. A Java applet is another example of an active content component or module. Active content components can also take the form of executable scripts such programs written in JavaScript or VBScript.

An active program component such as described above typically comprises an independent body of code, separate from the body of code that implements the browser component. In many cases, the two distinct bodies of code are implemented by different companies. Coordination between the browser and any of its active program components is by way of well defined program interfaces.

The visual content generated by an active content component can have selectable objects. Typically, the active content component itself responds to activation or selection of such objects, in ways that are determined by the particular programmed characteristics of the component.

In the more common desktop environment, when using a roaming cursor such as a mouse-controlled pointer, movement among the selectable objects of an active control is seamless. Specifically, a computer's operating system manages mouse-controlled pointer movement and signals the browser when the mouse is clicked at a point within the area controlled by the browser, also providing the coordinates of the pointer at the time of the mouse click. If the pointer happens to be over the content generated by the active control, the browser passes the mouse-click information to the active control, and the active control determines whether the supplied coordinates correspond to one of its selectable objects and responds in accordance with its programmed characteristics.

When using a tabbed focus metaphor, however, seamless movement has not been possible. In this situation, the browser treats an active control as a single selectable object. When the focus moves to the active content, the active object is notified that it is now responsible for the focus, and further directional inputs from the user are directed through the browser to the code underlying the active content.

Generally, the active content responds by initially assigning the focus to a default one of its focus targets. In some cases, this is adequate. In other cases, however, the default focus target is not the natural choice when the focus targets of the active control are evaluated in the larger context of the all the focus targets that are currently being displayed— including those that are not part of the active content. For example, a user might have pressed an "up" key to move the focus into an active control having a column of potential focus targets. The natural behavior in this situation would be for the focus to move to the bottom one of the active control's focus targets. However, it might be the case that the top one of the control's focus targets is the default target, and the focus would therefore bypass the lower targets and jump immediately to the top focus target. This behavior can be disorienting to a user. Similar disorienting behavior can result when tabbing the focus out of the control, back into the focus targets that are under the control of the browser.

SUMMARY

Application programming interfaces are defined that allow seamless focus movement between selectable focus targets of container content and of active content. Two different modes of operation are possible. In one mode of operation, a container component such as a browser queries an interface of the active content component to determine the locations of focus targets within the active content. The container component then handles movement of the focus among the focus targets, including the focus targets of the active content component. When the container component decides that it is appropriate to move the focus to one of the targets of the active content component, the container calls an interface of the active content component to designate which of the active content component's targets now has the focus.

In another mode of operation, the container component is responsible for moving the focus among its own content, while the active content component undertakes responsibility for moving the focus among the targets of its content. When the container component determines that an appropriate response to user input is to move the focus into the active content, the container component provides the active content component with focus movement descriptors that allow the active content component to make an appropriate choice for initial assignment of the focus. Likewise, when the active content component determines that an appropriate response to user input is to move the focus back out of the active content, the active content component provides the container component with similar focus movement descriptors that allow the container component to make an appropriate choice for initial assignment of the focus within its focus targets.

BRIEF DESCRIPTION OF THE DRAWINGS

The same reference numerals are used throughout the drawings to reference like components and features.

DETAILED DESCRIPTION

Exemplary Operational Environment

Figure 1:
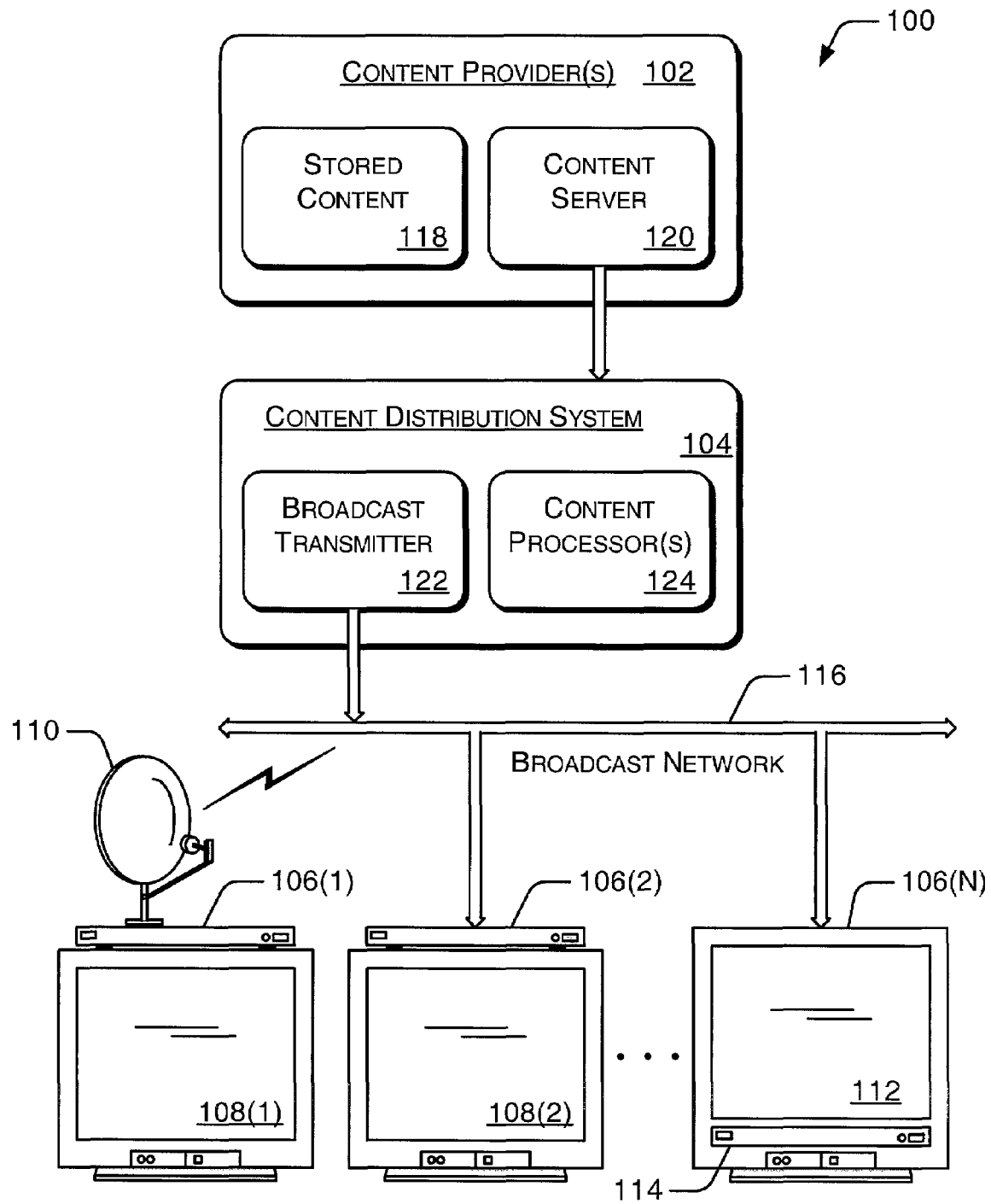
FIG. 1 illustrates an exemplary environment in which the methods and systems described herein may be implemented.

FIG. 1 illustrates an exemplary environment 100 in which the methods and systems described herein may be implemented. One or more content providers 102 include stored content 118 and a content server 120. Content server 120 controls the movement of content (including stored content 118) from the content provider 102 to a content distribution system 104, which is coupled to the content provider. Additionally, the content server 120 controls the movement of live content (e.g., content that was not previously stored by the content provider) and content stored at other locations to the content distribution system. Stored content 118 can comprise both HTML content and active content. Active content typically comprises non-HTML content, and may include code or script that is called and executed to generate visual information or other types of information.

The content distribution system 104 contains a broadcast transmitter 122 and one or more content processors 124. Broadcast transmitter 122 broadcasts signals (e.g., cable television signals) across a broadcast network 116, such as a cable television network. Broadcast network 116 may include wired or wireless media using any broadcast format or broadcast protocol. Content processor 124 processes the content received from content provider 102 prior to transmitting the content across the broadcast network 116. A particular content processor may encode or otherwise process the received content into a format that is understood by multiple client devices 106 coupled to the broadcast network 116. Although FIG. 1 shows a single content provider 102 and a single content distribution system 104, a particular environment may include any number of content providers coupled to any number of content distribution systems.

A client device 106(1) receives broadcast content from a satellite-based transmitter via a satellite dish 110. Client device 106(1) is also referred to as a set-top box, game console, entertainment device, or a satellite receiving device. Client device 106(1) is coupled to a television 108(1) for presenting the content received by the client device (i.e., audio data and video data) as well as a graphical user interface. A particular client device 106 may be coupled to any number of televisions 108. Similarly, any number of client devices 106 may be coupled to a television 108. Another client device 106(2) is coupled to receive broadcast content from broadcast network 116 and provide the received content to a television 108(2). Another client device 106(N) is a combination of a television 112 and a set-top box 114. In this example, the various components and functionality of the set-top box are incorporated into the television, rather than using two separate devices. The set-top box incorporated into the television may receive broadcast signals via a satellite dish (similar to satellite dish 110) and/or via broadcast network 116. In alternate embodiments, client devices 106 may receive broadcast signals via the Internet or any other broadcast medium.

Figure 2:
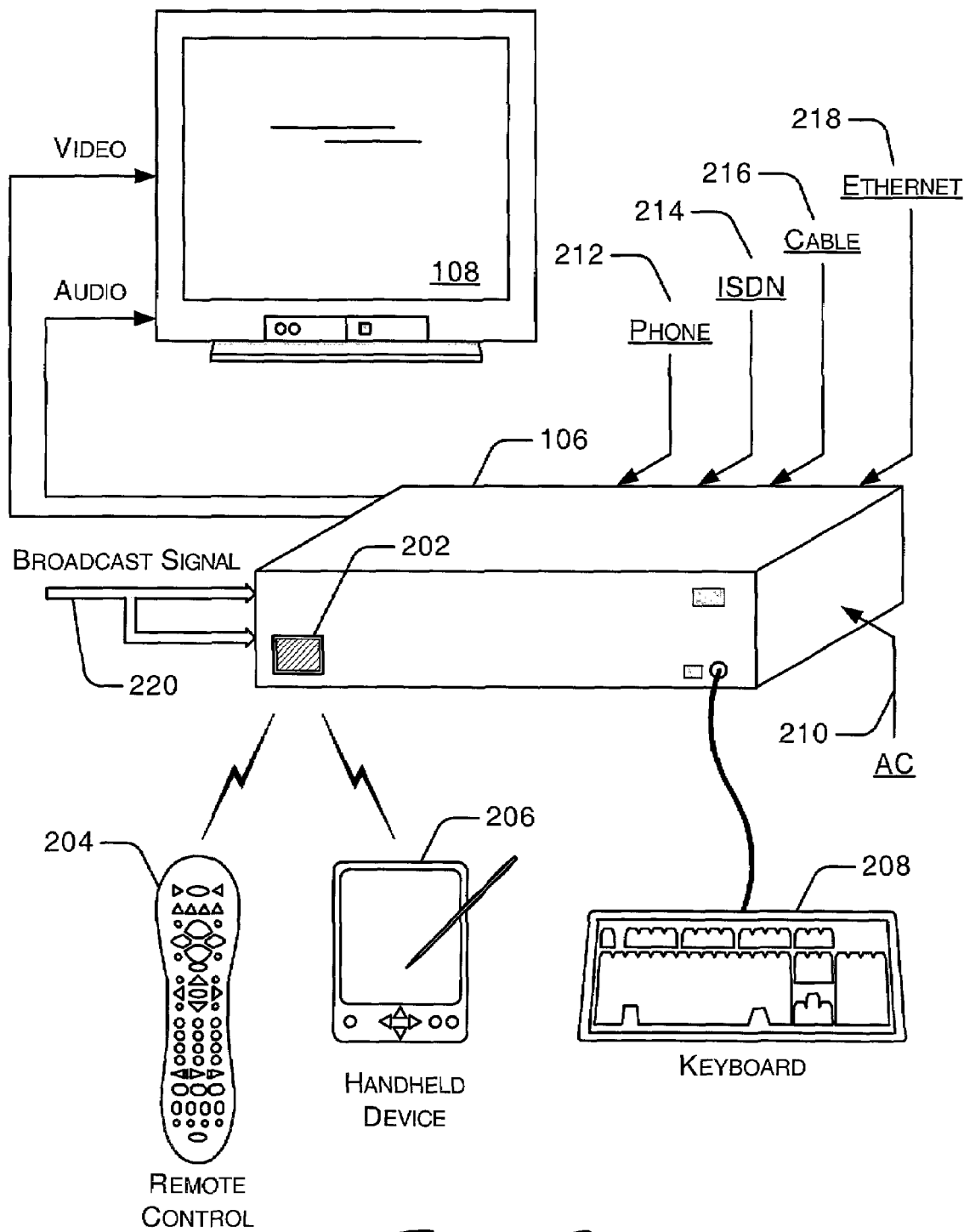
FIG. 2 is a block diagram of an example client device, a television, and various input devices that interact with the client device.

FIG. 2 is a block diagram of an example client device 106, television 108, and various input devices that interact with the client device. As discussed above, client device 106 may also be referred to as a set-top box, game console or a satellite receiver.

Client device 106 includes a wireless receiving port 202 (e.g., an infrared IR) wireless port) for receiving wireless communications from a remote control device 204, a handheld device 206 (such as a personal digital assistant (PDA) or handheld computer), or other wireless device, such as a wireless keyboard. Additionally, a wired keyboard 208 is coupled to client device 106 for communicating with the client device. In alternate embodiments, remote control device 204, handheld device 206, and/or keyboard 208 may us an RF communication link (or other mode of transmission) to communicate with client device 106.

In the exemplary system described herein, a tabbed focus technique is used, in which a focus is moved around on a visual display in response to directional inputs from a user. Such directional inputs are provided by pressing keys of remote control 204, handheld device 206, or keyboard 208. Such keys might comprise four orthogonal direction keys (up, down, left, and right), or might allow movement in additional directions. Alternatively, a particular input device might utilize a joystick or similar mechanism for directional input, and such an input device might provide increased angular granularity as opposed to the four-direction granularity provided by four orthogonal direction keys.

Client device 106 receives one or more broadcast signals 220 from one or more broadcast sources (e.g., from a broadcast network or via satellite). Client device 106 includes hardware and/or software for receiving and decoding broadcast signal 220, such as an NTSC, PAL, SECAM or other TV system video signal, and providing video data to the television 108. Client device 106 also includes hardware and/or software for providing the user with a graphical user interface by which the user can, for example, access various network services, configure the client device 106, and perform other functions.

Client device 106 receives AC power on line 210. Client device 106 is capable of communicating with other devices via a conventional telephone link 212, an ISDN link 214, a cable link 216, and an Ethernet link 218. A particular client device 106 may use any one or more of the various communication links 212–218 at a particular instant. Client device 106 also generates a video signal and an audio signal, both of which are communicated to television 108. The video signals and audio signals can be communicated from client device 106 to television 108 via an RF (radio frequency) link, S-video link, composite video link, component video link, or other communication link. Although not shown in FIG. 2, a particular client device 106 may include one or more lights or other indicators identifying the current status of the client device. Additionally, a particular client device 106 may include one or more control buttons or switches (not shown) for controlling operation of the client device.

Figure 3:
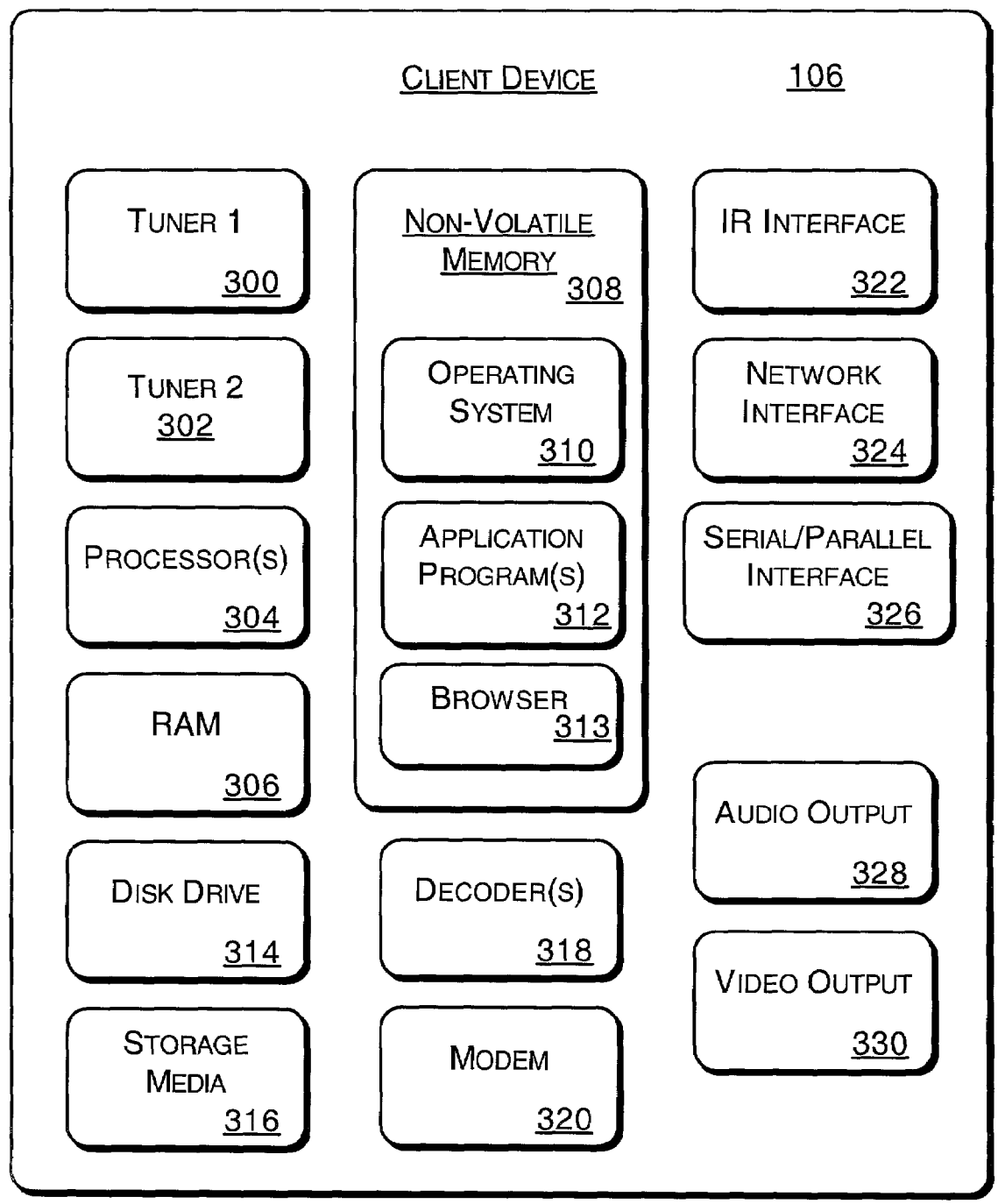
FIG. 3 is a block diagram of selected components of the client device shown in FIGS. 1 and 2.

FIG. 3 is a block diagram of selected components of the client device 106 shown in FIGS. 1 and 2. Client device 106 includes first and second tuners 300 and 302, one or more processors 304, and computer readable storage media. In this example, the computer-readable storage media comprises primary random access memory (RAM) 306, secondary non-volatile memory 308 such as a hard disk, a removable disk drive 314 and associated removable storage media 316. Although client device 106 is illustrated having various different types of computer-readable media, a particular implementation may include only one of the memory components, or might include other types of memory components. Additionally, although not shown, a system bus typically couples together the various components within client device 106.

Much of the functionality of client device 106 is embodied or enabled by computer-executable instructions, such as program modules, that are stored in one or more of the available types of computer-readable storage media, and that are retrieved and executed by processor(s) 304. The instructions and/or program modules are stored at different times in the various computer-readable media that are either part of the device or that can be read by the device. Programs are typically distributed, for example, on floppy disks, CD-ROMs, DVD, or some form of communication media such as a modulated signal. From there, they are installed or loaded into the secondary or non-volatile memory of a device, such as the device's hard disk. At execution, they are loaded at least partially into the primary electronic memory. The invention described herein includes these and other various types of computer-readable media when such media contain instructions, programs, components, application programming interfaces (APIs) and/or modules for implementing the steps and actions described below in conjunction with microprocessors or other data processors. The invention also includes the device itself when programmed according to the methods and techniques described above.

As examples of program components, FIG. 3 shows an operating system 310 and application programs 312. A browser 313 is a specific example of an application program or program component that is particularly relevant to the discussion which follows. Generally, applications programs including browser 313 are executed by processor(s) 304 and run under or in conjunction with operating system 310.

Portions of functionality described herein may also be implemented in hardware or a combination of hardware, software, and/or firmware. For example, one or more application specific integrated circuits (ASICs) or programmable logic devices (PLDs) could be designed or programmed to implement one or more portions of the functions described below.

Client device 106 includes a decoder 318, such as an MPEG decoder that decodes MPEG-encoded signals. MPEG (Moving Pictures Experts Group) is a standard for digital video and digital audio compression. MPEG-2 is a particular version of this standard, which supports a variety of audio/video formats including legacy TV, HDTV (High-Definition Television), and five channel surround sound. Other types of encoding might be substituted for MPEG encoding in certain implementations.

Client device 106 includes a modem 320 that allows client device 106 to communicate with other devices via a conventional telephone line. An IR interface 322 allows client device 106 to receive input commands and other information from a user-operated device, such as a remote control device or an IR keyboard. Client device 106 also includes a network interface 324, a serial/parallel interface 326, an audio output 328, and a video output 330. Interfaces 324 and 326 allow the client device 106 to interact with other devices via various communication links. Although not shown, client device 106 may also include other types of data communication interfaces to interact with other devices. Audio output 328 and video output 330 provide signals to a television or other device that processes and/or presents the audio and video data. Although client 106 is illustrated having multiple interfaces, a particular client may include only one or two of such interfaces.

Although client device 106 is depicted in this embodiment as a set-top box operating in conjunction with a traditional television set, the particular techniques described below are not limited to this environment. Specifically, many of the components illustrated in FIGS. 1–3 can be considered optional-different implementations will have differences in their specific components and capabilities.

For example, the techniques described below can be implemented within various different general purpose or special purpose computing system configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments, and entertainment systems.

Focus Coordination Between Browser-Generated and Active Content

Figure 4:
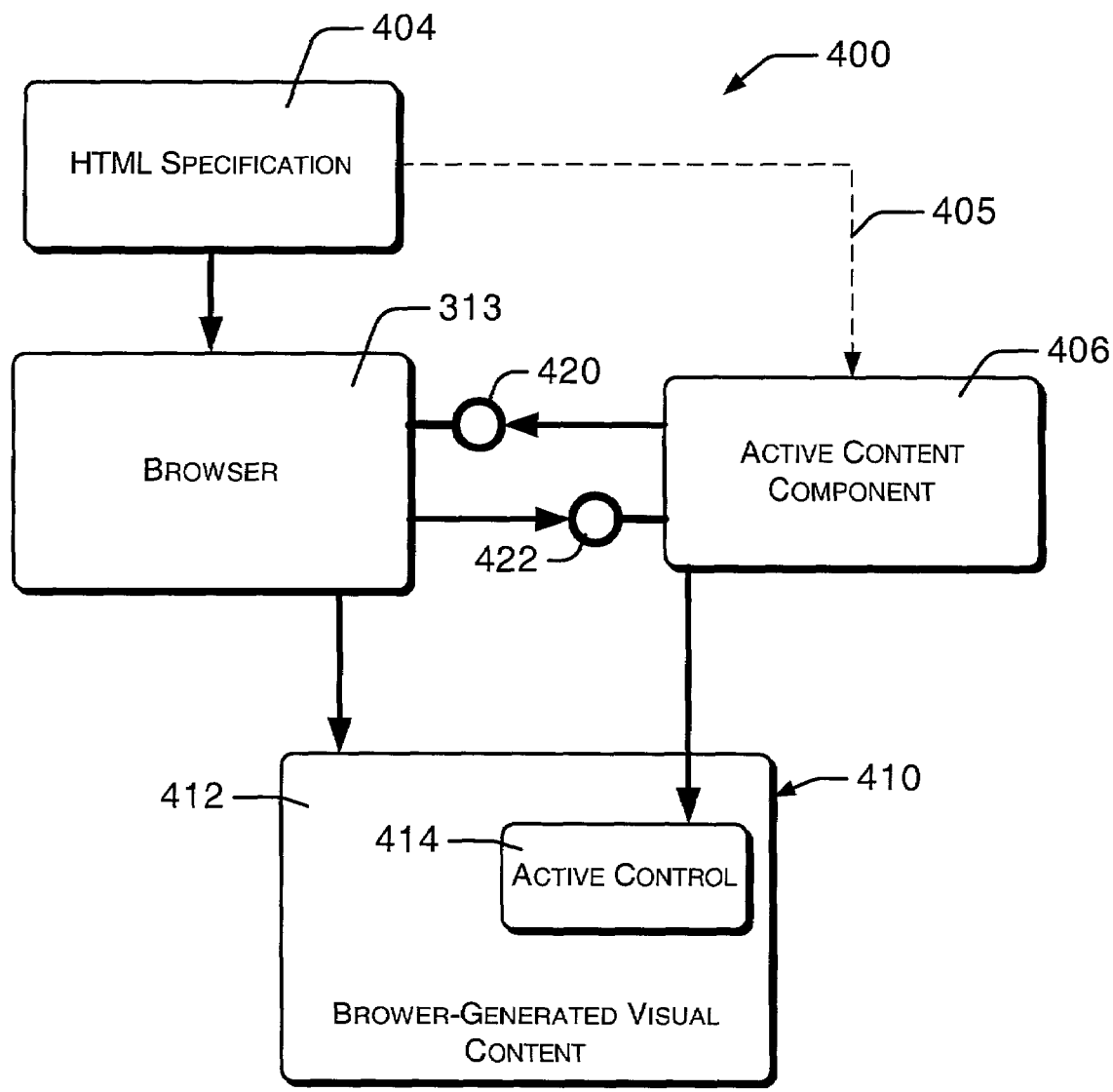
FIG. 4 is a block diagram showing logical components of a system for displaying visual content and for coordinating focus movement between container-generated content and active content.

FIG. 4 shows pertinent logical components of an entertainment system 400 that can be used to implement the techniques that will be described in more detail below. System 400 can be implemented by the components described above with reference to FIGS. 1–3. Specifically, system 400 represents functionality that can be implemented within client device 106.

The entertainment system of FIG. 4 includes a container component or application, such as browser 313 (also shown in FIG. 3). Typically, a browser such as this is used to allow a user to interact with the functionality of the system or to allow the user to navigate through interlinked visual content such as the World Wide-Web of the Internet.

Browser 313 operates by retrieving content descriptions or specifications, interpreting such descriptions or specifications, and rendering the resulting visual content on a display device such as television 108 shown in FIGS. 1 and 2. The content descriptions and specifications can be obtained locally, such as from local storage devices. Alternatively, or additionally, content descriptions and specifications can be obtained from remote sources such as the content providers 102 shown in FIG. 1.

In this example, the content description or specification takes the form of an HTML (hypertext markup language) document or specification 404. An HTML document contains content such as text, graphical information, and links or references to other content, along with marks or tags that instruct browser 313 regarding how to arrange the various content. The browser reads the HTML document, interprets it, and in response generates and renders visual content.

An HTML specification can contain links or references to active content components. In this example, HTML specification 404 includes a link or reference 405 to an active content component 406, which might comprise an ActiveX® control or a Java applet. As mentioned above, an active content component, also referred to herein as an active visual component, typically comprises non-HTML content, usually implemented by executable code external to the browser. This non-browser executable code is called or initiated by a container component or application—in this case browser 313—to generate visual content within or in conjunction with the other visual content generated by the container application.

In FIG. 4, the combined visual content generated by browser 313 in conjunction with active content component 406 is represented by a block generally referenced by numeral 410. A first portion of this content, represented by reference numeral 412, is generated by browser 313 by interpreting HTML specification 404. This portion of the visual content will be referred to herein as browser-generated or container-generated content. A subset of the displayed visual content, represented by reference numeral 414, is generated by active content component 406. This portion of the content will be referred to herein at times as the active content or as an active control. The active content potentially contains its own focus targets. The focus targets within the active content will be referred to herein at times as active content focus targets. The active content component is usually configured to respond programmatically to selection of the active content focus targets. Note that although the active content is usually rendered within the browser-generated content, the active content will not always be clearly delineated visually from the browser-generated content.

When generating visual content 410, browser 313 generates content specified by HTML specification 404, and calls or initiates active content component 406 to generate active content 414. Although browser 313 knows the portion of the visual display area that will be generated by active component 406, the browser does not generate this content directly. Rather, it calls active component 406 to generate the content.

Although in this example the active content component is called to execute and display its content within a browser, similar functionality could be implemented in conjunction with other types of container modules, components, or applications, other than browsers.

In the described implementation, browser 313 utilizes a tabbed focus model, where a focus is tabbed among focus targets. In many cases, the focus targets comprise conventional hyperlinks such as are typically in HTML-based documents. Other types of focus targets are also possible, such as fields for inputting data or selecting functions.

Both browser-generated content 412 and active content 414 can contain focus targets. Browser 313 is responsible for responding to selection of focus targets with browser-generated content 412, and active content component 406 is responsible for responding to selection of focus targets within active content 414.

User input such as keystrokes are conveyed using conventional techniques through the operating system to browser 313. When the focus is within active content 414, the browser conveys the user input to active content component 406. Existing application programming interfaces (APIs), not shown, are used for this purpose. ActiveX® and Java controls are examples of active content components for which protocol standards already exist, allowing integration of these active controls within conventional HTML content. As described above in the "Background" section, however, existing protocols do not allow seamless movement of a tabbed focus between browser content and active content. The techniques and APIs described below, on the other hand, provide for such seamless movement.

Browser 313 exposes a browser or container application programming interface (API) 420 that is callable by active content component 406, and active content component 406 exposes an API 422 that is callable by browser 313. The purposes and functionality of these interfaces will be described in more detail as the discussion proceeds. Generally, these interfaces allow seamless movement of a focus between the focus targets of browser-generated content and the focus targets of active content.

Figure 5:
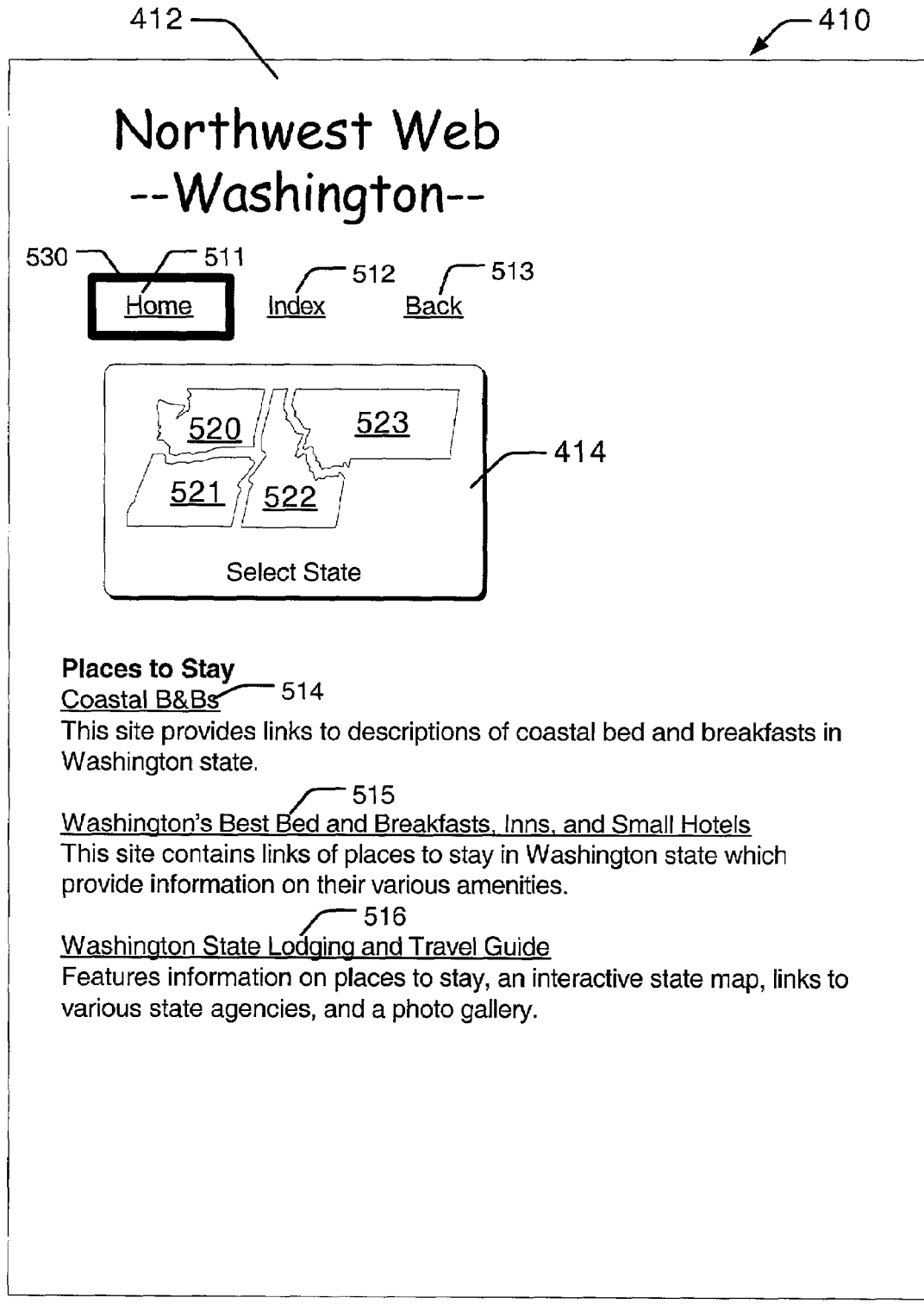
FIGS. 5–8 illustrate desired coordination of focus movement between container-generated content and active content.

FIG. 5 shows an example of visual content 410 that includes browser-generated content 412 and an active visual control 414. The browser-generated content 412 includes a plurality of browser-generated focus targets 511–516. The active visual content includes active content focus targets 520–523.

In this example, the tabbed focus is represented as a rectangle 530. In actual implementation, such a rectangle might be drawn in a bright or contrasting color, such as bright yellow. The focus 530 is moved among the focus targets in response to directional inputs from a user—such as by a user pressing directional keys on a remote keypad.

Figure 6:
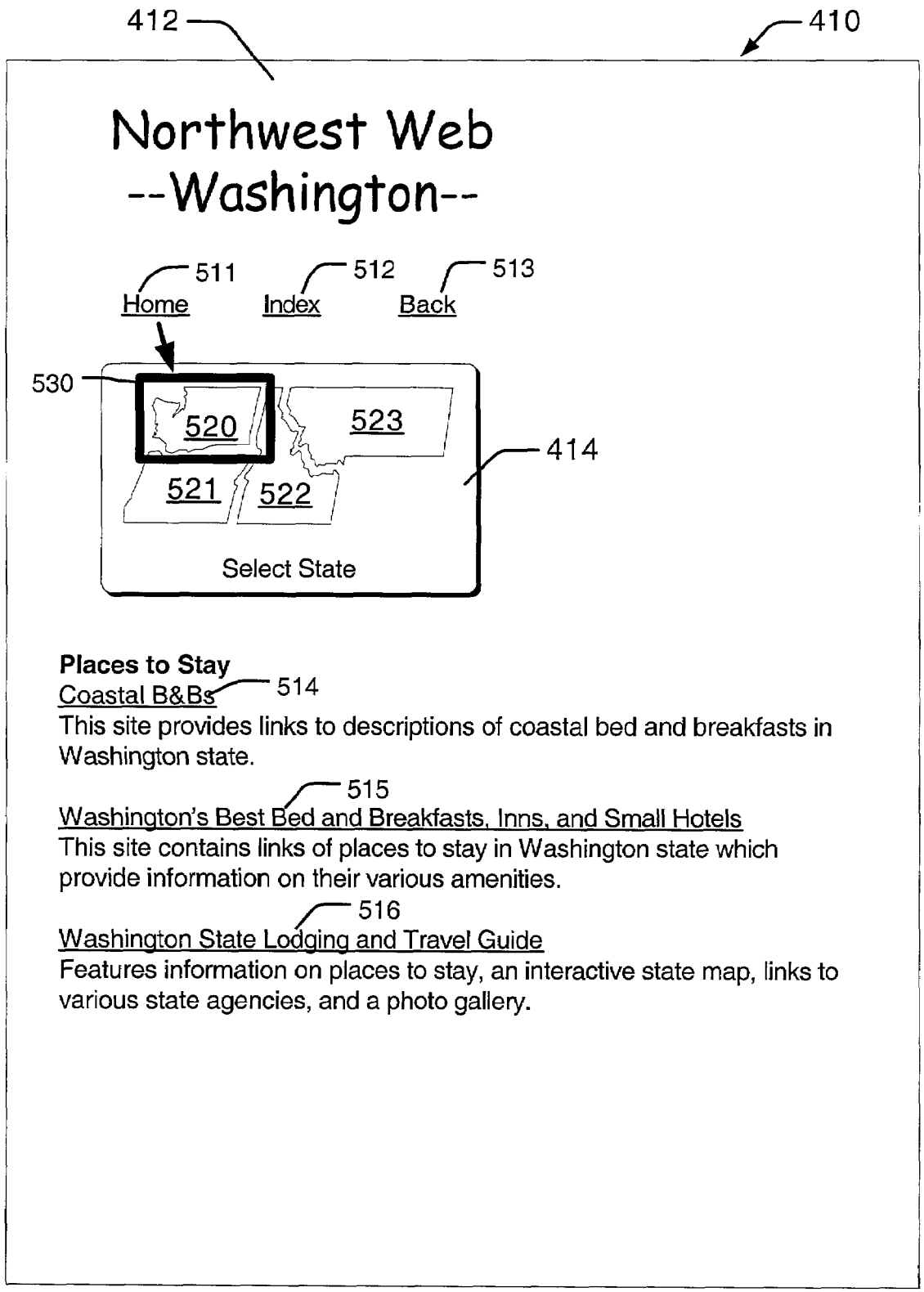
Figure 7:
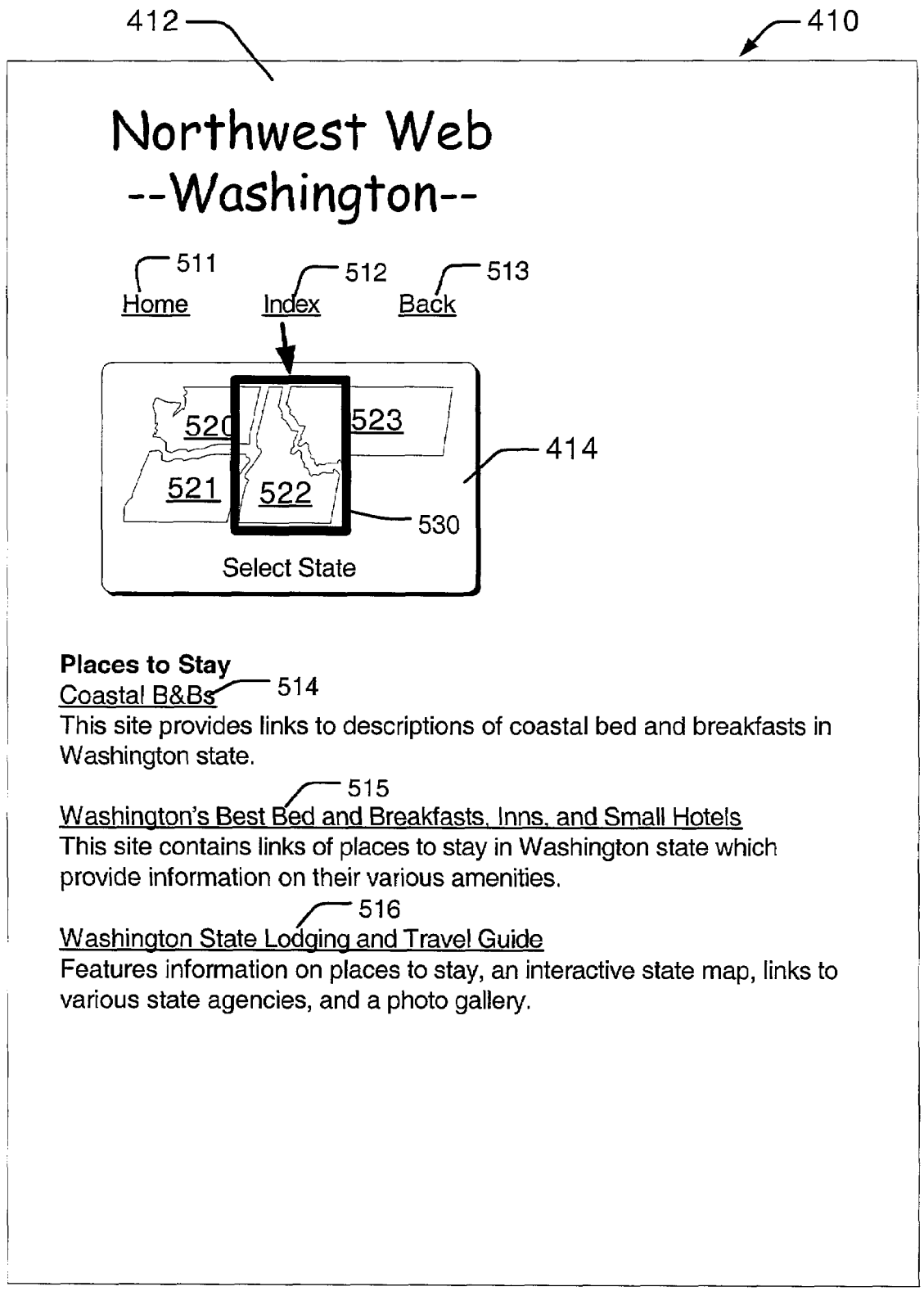
Figure 8:
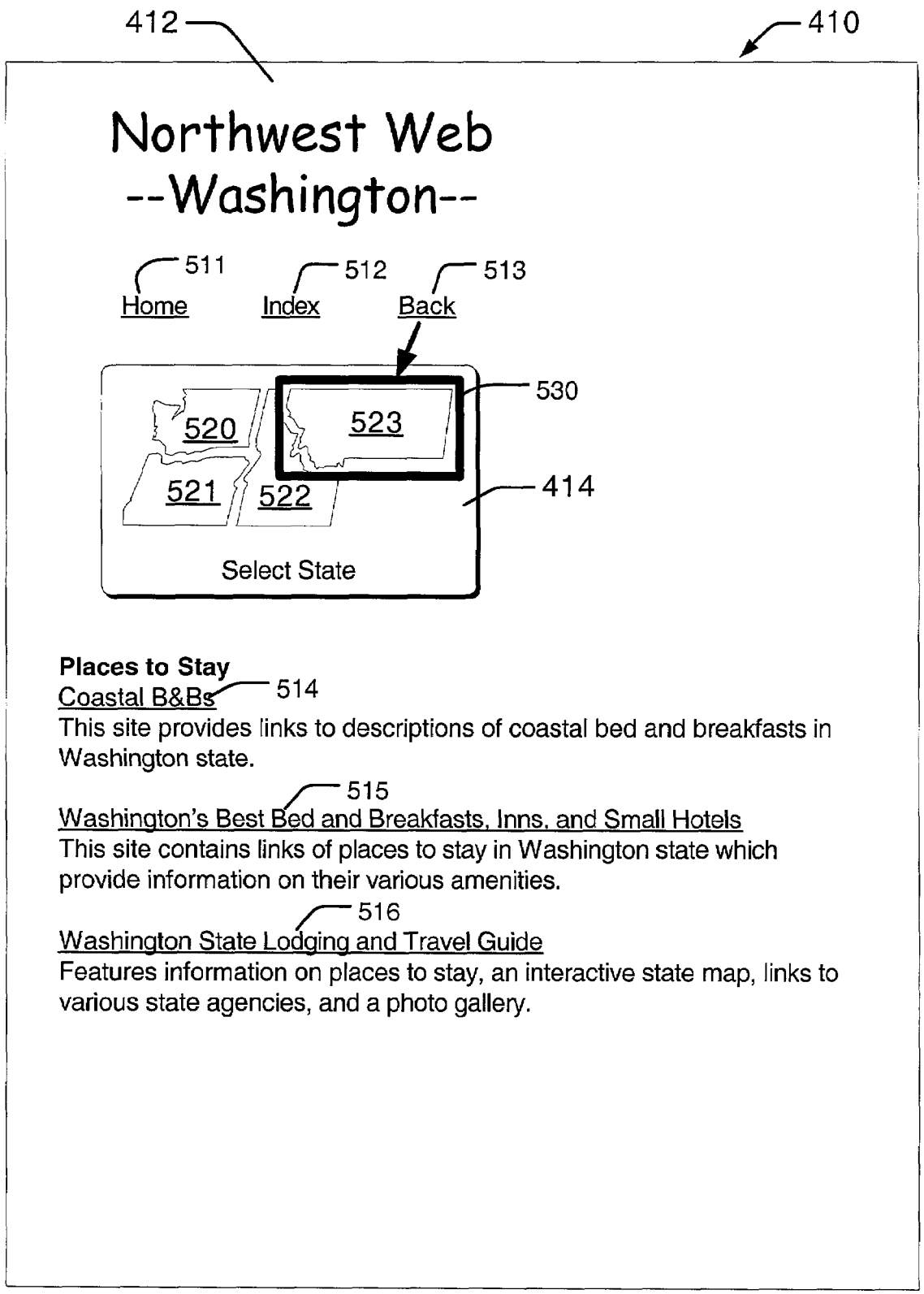

Browser 313 has internal rules for determining where the focus should move in response to user directional inputs. Movement of the focus into an active control and out of such an active control can be coordinated in two different ways, which will be described in more detail below. FIGS. 6–8 illustrate examples of desired movement of focus 530 from browser-generated focus targets to active content focus targets.

In FIG. 6, the focus was originally on browser-generated target 511 and the user has pressed a down key. In response, focus 530 has moved to active content focus target 520, which is most closely located in the "down" direction from focus target 511.

In FIG. 7, the focus was originally on browser-generated target 512, and the user has pressed a down key. In response, focus 530 has moved to active content focus target 522, which is most closely located in the "down" direction from focus target 512.

In FIG. 8, the focus was originally on browser-generated target 513, and the user has pressed a down key. In response, focus 530 has moved to active content focus target 523, which is most closely located in the "down" direction from focus target 513.

In the conditions illustrated by any of FIGS. 6–8, subsequently pressing an "up" directional key would result in the reverse movement of focus 530: in FIG. 6 from target 520 to target 511; in FIG. 7 from target 522 to target 512; and in FIG. 8 from target 523 to target 513.

FIGS. 6–8 demonstrate examples of desired coordination of focus movement between the browser-generated content 412 and active content 414. In actual implementation, such coordination is accomplished by way of interfaces 420 and 422 of FIG. 4, the details of which will be explained in more detail below. Prior to a detailed discussion of the APIs, however, a general operational description will be given, illustrating two different ways in which a focus can be coordinated to move seamlessly between container content and active content.

Browser Controlled Focus

Figure 9:
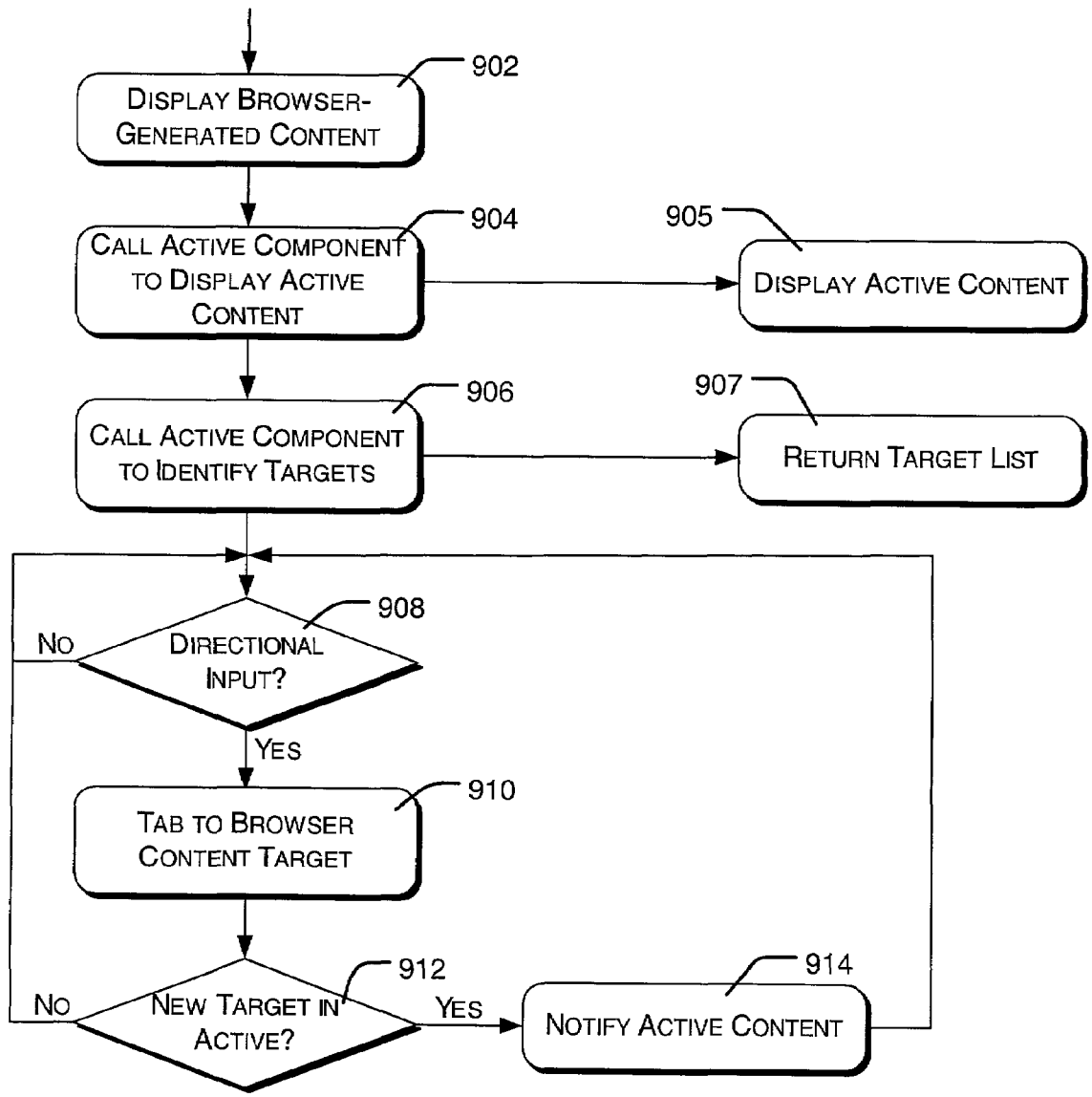
FIG. 9 is a flowchart illustrating methodological aspects of coordinating focus movement between container-generated content and active content.

FIG. 9 shows methodological steps performed in one implementation, for tabbing a focus between focus targets. In this implementation, browser 313 calls interface 422 of active content component 406 to identify locations of focus targets within the active content. Thereafter, the browser itself responds to directional control inputs from a user to tab among the targets of both the browser-generated content and the active content, based on the locations identified through the call to interface 422.

An action 902 comprises displaying first visual content having one or more first focus targets. In the embodiments described herein, the first visual content comprises content generated by a container component such as browser 313, and the first focus targets are those focus targets that are part of the browser-generated content, such as focus targets 511–516 in FIGS. 5–8.

An action 904 comprises calling an active visual component or active content component to generate and display second visual content within the first, browser-generated visual content. The second, active content has second focus targets, also referred to herein as active content focus targets. Examples of focus targets within the active content in FIGS. 5–9 comprise targets 520–523. Generally, the active content is within the browser-generated content, although it will not always be clearly delineated visually from the browser-generated content. An action 905, performed by the active content, component comprises displaying the active content.

An action 906 comprises calling interface 422 of the active visual component with a request to identify locations of the active content focus targets. Active content component 406 receives the request and in response performs an action 907 of returning an array listing the locations of its focus targets.

An action 908 comprises waiting for a directional input from a user. Once a directional input is detected, an action 910 comprises tabbing the focus to one of the focus targets, depending on the nature of the input. The focus can be tabbed to one of the focus targets of the browser-generated content or to one of the focus targets of the active content. The decision of which focus target to assign the focus is based on the particular directional input received (such as UP, DOWN, RIGHT, or LEFT), on the location of the currently focused target, and on the locations of other focus targets relative to the currently focused target—including both the focus targets of the browser-generated content and the focus targets of the active content.

An action 912 comprises determining if the newly focused target is one of the targets within the active content. If so, an action 914 is performed of calling interface 422 of active content component 406 to notify the active content that the focus has been moved within the active content, and to provide an indication of the particular focus target that has been assigned the focus. Active content component 406 receives the indication.

After notifying the active content in action 914, or after decision 912 if the new target is not in the active content area, execution returns to action 908 to await another directional input from the user.

When the focus is located at one of the targets of the browser-generated content, the browser is responsible for drawing the focus. When the focus is located at one of the targets of the active content, the focus can also be drawn by the browser. Alternatively, the active content component can be configured to draw the focus, in response to being notified in action 914 that one of the active content targets has been assigned the focus.

Shared Focus Control

Figure 10:
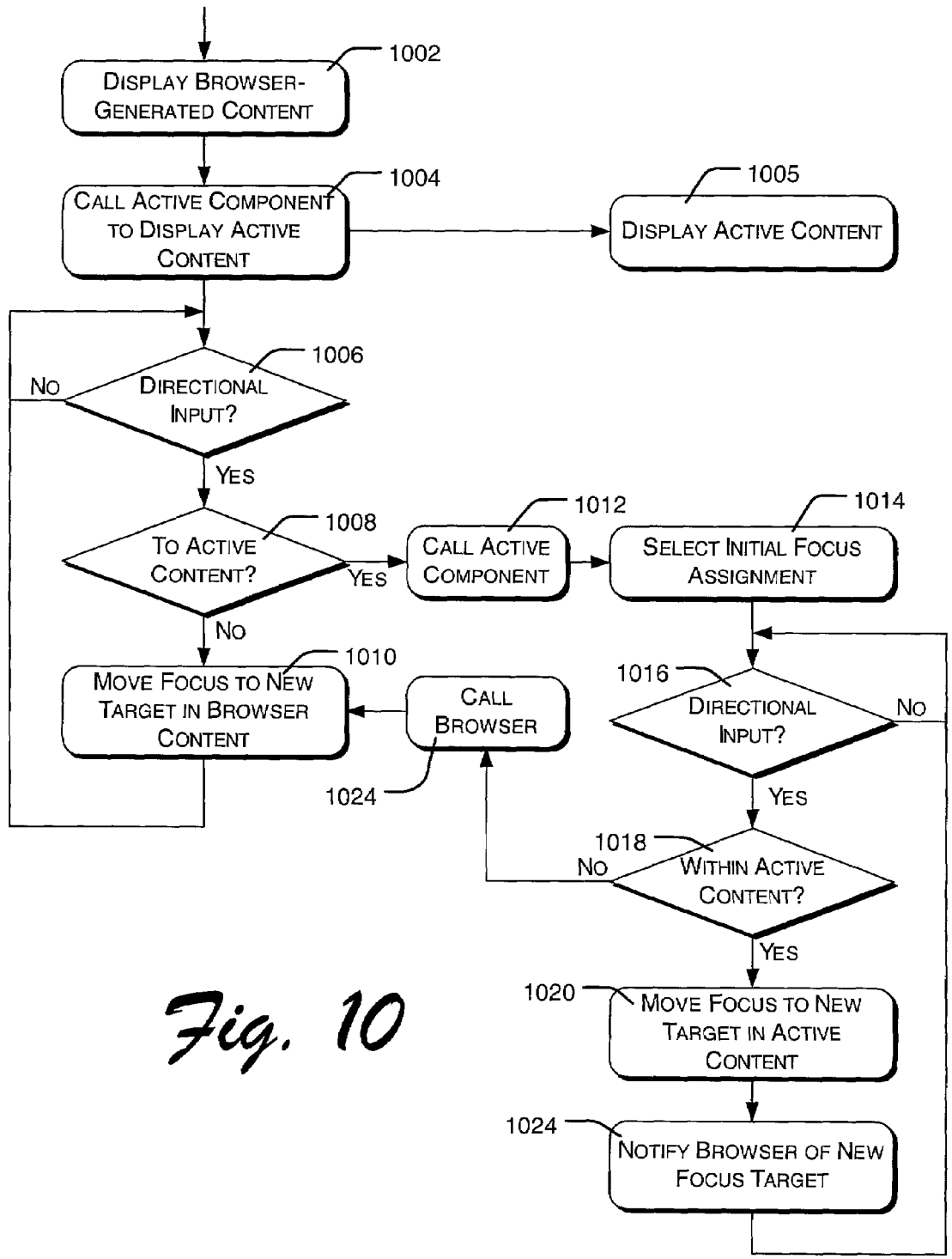
FIG. 10 is a flowchart illustrating alternative methodological aspects of coordinating focus movement between container-generated content and active content.

FIG. 10 shows methodological steps performed in another implementation, for tabbing a focus between focus targets of browser-generated content and focus targets of embedded active content. The actions on the left are performed by a container application or component such as browser 313, while those on the right are performed by an active content component such as component 406.

Generally, in this embodiment, browser 313 is responsible for moving or tabbing the focus among targets of the browser-generated content, and the active content component 406 is responsible for moving or tabbing the focus among targets of the active content.

An action 1002 comprises displaying first visual content having one or more first focus targets. In the embodiments described herein, the first visual content comprises content generated by browser 313, and the first focus targets are those focus targets that are part of the browser-generated content, such as focus targets 511–516 in FIGS. 5–8.

An action 1004 comprises calling an active visual component or active content component such as component 406 of FIG. 4 to generate and display second visual content within the first, browser-generated, visual content. The second, active content has second focus targets, also referred to herein as active content focus targets. Examples of focus targets within the active content in FIGS. 5–9 comprise targets 520–523. Generally, the active content displayed is within the browser-generated content, although it will not always be clearly delineated visually from the browser-generated content. An action 1005, performed by the active content component, comprises displaying the active content.

An action 1006 comprises waiting for a directional input from a user. Once a directional input is detected, an action 1008 comprises determining whether the directional input calls for movement of the focus to another focus target of the browser-generated content, or whether the active content lies in the direction of the directional input. The browser evaluates this based on the current position of the focus, the positions of nearby focus targets in the browser-generated content, the position of the active content, and the direction of desired focus movement specified by the directional input. If these factors call for moving the focus to another target within the browser-generated content, this action is performed in an action 1010, and execution returns to action 1006 to await further directional input.

If the factors listed above indicate that the active content lies in the direction or path of the desired focus movement, relative to the original location of the focus, an action 1012 comprises calling an interface of the active content component with one or more inbound focus movement descriptors and with a request to pass responsibility for tabbing the focus to the active content component. The focus movement descriptors indicate information about the manner in which the focus is being moved into the active content. Specifically, in the described embodiment, the focus movement descriptors indicate the position and direction from which the focus is moving into the active content, thereby allowing the active content component to determine which of its focus targets to initially assign the focus. The active content receives the request and in response performs an action 1014 of determining an initial one of its focus target to assign the focus, and assigns the focus to that focus target. The determination of which focus target to assign the focus is based at least in part on the provided one or more inbound focus movement descriptors, and on the positions of the available focus targets within the active content. Note that if there are no focus targets within the active content, the active content turns down the request of action 1012, and the browser retains the focus within the browser-generated content.

A subsequent action 1016 comprises the active content component waiting for a further directional input from a user. Once a directional input is detected, an action 1018 comprises determining whether the directional input calls for movement of the focus to another focus target of the active content, or whether the directional input calls for movement of the focus outside the area controlled by the active content component. The active content component evaluates this based on the current position of the focus within the active content, the positions of nearby focus targets in the active content, and the direction of desired focus movement specified by the directional input. If these factors call for moving the focus to another target within the active content, this is performed in an action 1020. In addition, an action 1022 is performed of calling interface 420 of browser 313 to notify the browser of the position within the active content to which the focus has been moved. This allows the browser to scroll the content into the active screen area if necessary for viewing the new target of the focus. Execution then returns to action 1016 to await further directional input.

If the factors considered in decision 118 indicate that the focus should be moved back out of the active content—usually when there is no focus target of the active content in the direction indicated by the user directional input—the active content component performs an action 1024 of calling interface 420 of browser 313 with one or more outbound focus movement descriptors, with a request to pass responsibility for focus tabbing back to the browser. The focus movement descriptors indicate information about the manner in which the focus is being moved from the active content. Specifically, in the described embodiment, the focus movement descriptors indicate the position and direction from which the focus is moving out of the active content and back into the content generated by browser 313. Browser 313 receives the request and in response performs action 1010, which comprises determining which of the browser targets to assign the focus, based on an evaluation of the focus movement descriptors and the positions of browser-generated focus targets, and moving the focus to the determined browser-generated target. Execution then loops back to action 1006 to await further user input. Note that if there are no appropriate focus targets within the browser-generated content, the browser turns down the request of action 1024, and the active content component retains the focus within the active content.

Similar to the implementation of FIG. 9, when the focus is located at one of the targets of the browser-generated content, the browser is responsible for drawing the focus. When the focus is located at one of the targets of the active content, the focus can also be drawn by the browser, based on the notification it receives in action 1024. Alternatively, the active content component can be configured to draw the focus when the focus is within the active content.

Active Content API

An active content component designed to work with a browser in the manner discussed above implements an API (application programming interface) 422 that facilitates coordination of focus movement between browser-generated content and active content. In general, an API is a set of functions or "methods" that can be called, potentially with arguments, by program components. In the Windows® operating system environment, APIs and their methods are often implemented in accordance with a convention known as the Component Object Model or COM. In the example described herein, API 422 is implemented as a COM interface, exposing methods that can be called by browser 313. The individual methods are discussed below. Note that it is not necessary for an active content component to support all of the methods. For example, some of the methods need to be implemented only when the browser controls movement of the focus through the targets of the active content.

The functions or methods of API 422 include a get_capabilities method that is callable by browser 313 to inspect the capabilities of the active content component. Specifically, the get_capabilities method returns flags indicating whether or not the active content component will assume responsibility for its own focus movement and whether or not it will draw the focus when the focus is within the active content. In addition, a flag is returned indicating that the browser should delay laying out and initializing the active content until the active content component subsequently makes a call to the browser's status_change method (described below). This is useful in cases where the active content component needs to wait to determine whether it can be responsible for focus movement until sometime after the active content has begun to be loaded by the browser.

The functions or methods of API 422 further include a get_target_count method that is callable by browser 313 to determine how many focus targets exist in the active content. The method returns a count of the number of focus targets in the active content. If the active content component is to be responsible for movement of the focus among the active content focus targets, this method is not called and therefore does not need to be implemented.

API 422 further includes a target_identification method that is callable by browser 313 to return actual locations of focus targets within the active visual content generated by the active content component. This method returns an array that specifies rectangular coordinates of the available active content focus targets. If the active content component is responsible for movement of the focus among the active content focus targets, this method is not called and therefore does not need to be implemented.

API 422 includes a set_focus method that is callable by browser 313 to assign a focus to a specified one of the focus targets. When calling this method, an argument is included indicating an index number of the particular focus target that is to receive the focus, in relation to the array of targets returned by the target_identification method. If the active content component is responsible for drawing the focus, it does so in response to this method being called. If the active content component is responsible for movement of the focus among the active content focus targets, this method is not called and therefore does not need to be implemented.

API 422 also includes a remove_focus method that is callable to un-assign the focus from its current assignment. If the active content component is responsible for movement of the focus among the active content focus targets, this method is not called and therefore does not need to be implemented.

A get_focus method is callable by browser 313 to identify a particular one of the focus targets which has currently been assigned the focus. This method returns an index number of the particular focus target that has the focus, in relation to the array of targets returned by the target_identification method. If the active content component is responsible for movement of the focus among the active content focus targets, this method is not called and therefore does not need to be implemented.

API 422 further includes an inbound_focus method that is callable by browser 313 to transfer responsibility for focus movement or tabbing to the active content component. This method accepts one or more inbound focus movement arguments. In the described embodiment, the focus movement arguments or descriptors comprise a directional indicator indicating a direction in which the focus is being transferred into the active content component. For example, this argument might have possible values of UP, DOWN, RIGHT, and LEFT, indicating the directional key that a user pressed that resulted in focus movement into the active content. NONE is another possible value of this argument, indicating that the focus is being moved into the active content without any user input, such as when the active content contains all of the available focus targets and the focus is moved within the active content when initially laying out the content.

The inbound focus movement arguments also comprise a positional indicator indicating a position from which the focus is being transferred into the active content. This argument typically specifies the rectangular coordinates of the browser-generated focus target that previously had the focus.

Alternatively, the inbound_focus method might accept a single inbound focus movement argument indicating a particular one of the active content targets that is to receive the focus, based on a previous identification of existing active content focus targets obtained by way of the target_identification method.

In response to the inbound_focus method, the active content component assigns the focus to an initial focus target (after evaluating the focus movement arguments and the relative positions of the available active content focus targets) and assumes responsibility for further movement or tabbing of the focus.

Note that the inbound_focus method is not called if the browser is responsible for focus movement among the targets of the active content, and therefore does not need to be implemented in this case.

Browser API

Browser 313 implements an API 420 that facilitates coordination of focus movement between browser-generated content and active content. Again, API 420 is implemented as a COM interface, exposing methods that can be called by active content components. Generally, the methods of this interface allow active content to notify the browser of changes in the active content that relate to focus movement. In addition, the methods allow active content component 406 to transfer responsibility for focus movement or tabbing back to browser 313.

API 420 includes a focus_changed method that is callable by active content component 406 to indicate the location of a focus target within the active content that has been assigned the focus. As an argument, this method accepts the rectangular coordinates of an active content focus target to which the focus has been moved. This method is used when the active content component has accepted responsibility for tabbing the focus among the active content targets. The notification provided by this method allows the browser to scroll the focused target into the viewing area if necessary, and to draw the focus if the browser is responsible for doing so.

A targets_changed method is callable by active content component 406 to notify browser 313 that the focus targets of the active content have changed. This allows the browser to call the get_target_count and target_identification methods of API 422 to get updated information on the target locations within the active content. This method is only called if the browser is responsible for movement of the focus among the focus targets of the active content.

API 420 includes a change_status method that is callable by active content component 406 to notify the browser of a change within the active content component regarding its ability to be responsible for focus movement within the active content focus targets. This method is called with an argument that indicates whether or not the active content component now wishes to be responsible for focus movement among its active content focus targets.

An outbound_focus method is callable by active content component 406 to transfer responsibility for focus movement or tabbing from the active content component, back to browser 313. This method accepts one or more outbound focus movement arguments or descriptors. In the described embodiment, the outbound focus movement arguments comprise a directional indicator indicating a direction in which the focus is being transferred from the active content component and into the browser-generated content. For example, this argument might have possible values of UP, DOWN, RIGHT, and LEFT, indicating the directional key that a user pressed that resulted in focus movement from the active content and into the browser-generated content.

The outbound focus movement arguments also comprise a positional indicator indicating a position from which the focus is being transferred from the active content and into the browser-generated content. This argument typically specifies the rectangular coordinates of the active content focus target that previously had the focus.

In response to the outbound_focus method, the browser component re-assumes responsibility for focus movement or tabbing.

Note that the outbound_focus method is not called if the browser maintains responsibility for focus movement among the targets of the active content.

API 420 also includes an invoke_soft_keyboard method that is callable by the active content component 406, to request browser 313 to open an alphanumeric input display that aids a user in entering alphanumeric characters. This method accepts an argument indicating the rectangular coordinate of a target focus within the active content that should remain visible in conjunction with the input display. This facilitates use of the input display to enter characters into a particular target focus of the active content.

CONCLUSION

Although details of specific implementations and embodiments are described above, such details are intended to satisfy statutory disclosure obligations rather than to limit the scope of the following claims. Thus, the invention as defined by the claims is not limited to the specific features described above. Rather, the invention is claimed in any of its forms or modifications that fall within the proper scope of the appended claims, appropriately interpreted in accordance with the doctrine of equivalents.

The invention claimed is:

1. A method comprising:
    displaying first visual content having one or more first focus targets;
    calling an active visual component to generate and display second visual content having second focus targets;
    tabbing a focus among the first focus targets in response to user directional input;
    calling the active visual component with one or more inbound focus movement descriptors to pass responsibility for tabbing the focus to the active visual component;
    the active visual component being responsive to the one or more inbound focus movement descriptors to determine which of its second focus targets to initially assign the focus;
    the active visual component tabbing the focus among its second focus targets in response to user input directional input;
    receiving a request from the active visual content to take back responsibility for tabbing the focus, the request including one or more outbound focus movement descriptors;
    determining which of the first focus targets to assign the focus in response to the outbound focus movement descriptors.

2. A method as recited in claim 1, wherein the inbound and outbound focus movement descriptors comprise directional indicators indicating directions in which the focus is being transferred.

3. A method as recited in claim 1, wherein the inbound and outbound focus movement descriptors comprise positional indicators indicating positions from which the focus is being transferred.

4. A method as recited in claim 1, wherein the inbound and outbound focus movement descriptors comprise:
    directional indicators indicating directions in which the focus is being transferred;
    positional indicators indicating positions from which the focus is being transferred.

5. An entertainment system comprising:
    one or more processors;
    a container component executable by the one or more processors to display first visual content having one or more first focus targets;
    an active content component executable by the one or more processors, wherein the active content component is callable by the container component to generate second visual content having second focus targets within the first visual content and to respond programmatically to selection of the second focus targets;
    wherein the active content component exposes one or more active content interfaces that the container component calls to identify locations of the second focus targets; and
    wherein the container component is further executable to tab a focus among the first and second focus targets, based at least in part on the identified locations of the second focus targets.

6. An entertainment system as recited in claim 5, wherein the container component draws the focus in the second visual content when tabbing the focus to one of the second focus targets.

7. An entertainment system as recited in claim 5, wherein the container component calls said one or more active content interfaces to notify the active content component when tabbing the focus to one of the second focus targets.

8. An entertainment system as recited in claim 5, wherein the container component calls said one or more active content interfaces to notify the active content component when tabbing the focus to one of the second focus targets, and wherein the active content component draws the focus in response to such notification.

9. An entertainment system as recited in claim 5, wherein the container component comprises a browser.

10. An entertainment system as recited in claim 5, wherein the container component comprises a browser and the first visual content is defined by a text markup language.

11. An entertainment system as recited in claim 5, wherein the active content component comprises an ActiveX® control.

12. An entertainment system as recited in claim 5, wherein the container component responds to directional control inputs from a user to tab among the first and second focus targets.

13. An entertainment system as recited in claim 5, further comprising a wireless remote control that accepts directional control inputs from a user, wherein the container component responds to the directional control inputs to tab among the first and second focus targets.

14. An entertainment system comprising:
one or more processors;
a container component executable by the one or more processors to display first visual content having one or more first focus targets and to tab a focus among the first focus targets;
an active content component executable by the one or more processors, wherein the active content component is callable by the container component to generate second visual content having second focus targets within the first visual content and to respond programmatically to selection of the second focus targets; and
wherein the active content component exposes one or more active content interfaces that the container component calls to transfer responsibility for focus tabbing to the active content component, wherein the one or more active content interfaces accept one or more inbound focus movement descriptors, the active content component being responsive to the one or more inbound focus movement descriptors to determine which of its second focus targets to assign the focus.

15. An entertainment system as recited in claim 14, wherein the one or more inbound focus movement descriptors comprise a directional indicator indicating a direction in which the focus is being transferred into the second visual content.

16. An entertainment system as recited in claim 14, wherein the one or more inbound focus movement descriptors comprise a positional indicator indicating a position from which the focus is being transferred into the second visual content.

17. An entertainment system as recited in claim 14, wherein the one or more inbound focus movement descriptors comprise:
a directional indicator indicating a direction in which the focus is being transferred into the second visual content; and
a positional indicator indicating a position from which the focus is being transferred into the second visual content.

18. An entertainment system as recited in claim 14, wherein the one or more inbound focus movement descriptors comprise a designation of a particular one of the second focus targets that is to initially be assigned the focus.

19. An entertainment system as recited in claim 14, wherein the container component exposes one or more container interfaces that the active content component calls to transfer responsibility for focus tabbing to the container component, wherein the one or more container interfaces accept one or more outbound focus movement descriptors, the container component being responsive to the one or more outbound focus movement descriptors to determine which of its first focus targets to assign the focus.

20. An entertainment system as recited in claim 19, wherein the one or more outbound focus movement descriptors comprise a directional indicator indicating a direction in which the focus is being transferred into the first visual content.

21. An entertainment system as recited in claim 19, wherein the one or more outbound focus movement descriptors comprise a positional indicator indicating a position from which the focus is being transferred into the first visual content.

22. An entertainment system as recited in claim 19, wherein the one or more outbound focus movement descriptors comprise:
a directional indicator indicating a direction in which the focus is being transferred into the first visual content; and
a positional indicator indicating a position from which the focus is being transferred into the first visual content.

23. An entertainment system as recited in claim 14, wherein the container component draws the focus in both the first and second visual content.

24. An entertainment system as recited in claim 14, wherein the container component draws the focus in the first visual content and the active content component draws the focus in the second visual content.

25. An entertainment system as recited in claim 14, wherein the container component exposes one or more container interfaces that the active content component calls when tabbing the focus to one of the second focus targets.

26. An entertainment system as recited in claim 14, wherein the container component exposes one or more container interfaces that the active content component calls when tabbing the focus to one of the second focus targets, and in response the container component draws the focus in the second visual content.

27. An entertainment system as recited in claim 14, wherein the container component comprises a browser.

28. An entertainment system as recited in claim 14, wherein the container component comprises a browser and the first visual content is defined by a text markup language.

29. An entertainment system as recited in claim 14, wherein the active content component comprises an ActiveX® control.

30. An entertainment system as recited in claim 14, wherein the container component and the active content component respond to directional control inputs from a user to tab among the first and second focus targets.

31. An entertainment system as recited in claim 14, further comprising a wireless remote control that accepts directional control inputs from a user, wherein the container component and the active content component respond to the directional control inputs to tab among the first and second focus targets.

32. One or more computer-readable storage media containing instructions that are executable by a computer to implement an active visual control, the active visual control exposing one or more application programming interfaces that are callable to perform actions comprising:
receiving a request to accept a focus and to tab the focus among focus targets of the active visual control in response to user input;
in conjunction with receiving the request, receiving one or more inbound focus movement descriptors; and determining which of the focus targets to initially assign the focus based at least in part on the one or more received inbound focus movement descriptors wherein the active visual control is configured to call one or more container interfaces to transfer responsibility for focus tabbing back to a container component and to provide one or more outbound focus movement descriptors.

33. One or more computer-readable storage media as recited in claim 32, wherein the one or more outbound focus movement descriptors comprise a directional indicator indicating a direction in which the focus is being transferred from the active visual control.

34. One or more computer-readable storage media as recited in claim 32, wherein the one or more outbound focus movement descriptors comprise a positional indicator indicating a position from which the focus is being transferred from the active visual control.

35. One or more computer-readable storage media as recited in claim 32, wherein the one or more outbound focus movement descriptors comprise:

a directional indicator indicating a direction in which the focus is being transferred from the active visual control; and a positional indicator indicating a position from which the focus is being transferred from the active visual control.

36. One or more computer-readable storage media containing instructions that are executable by a computer to implement a visual browser that performs actions comprising:

displaying first visual content having one or more first focus targets;

calling an active content component to generate second visual content having second focus targets within the first visual content;

calling one or more active content interfaces to identify locations of the second focus targets; and tabbing a focus among the first and second focus targets, based at least in part on the identified locations of the second focus targets.

37. One or more computer-readable storage media as recited in claim 36, the actions further comprising drawing the focus in the second visual content when tabbing the focus to one of the second focus targets.

38. One or more computer-readable storage media as recited in claim 36, the actions farther comprising calling said one or more active content is interfaces to notify the active content component when tabbing the focus to one of the second focus targets.

39. One or more computer-readable storage media as recited in claim 36, wherein the first visual content is defined by a text markup language.

40. One or more computer-readable storage media as recited in claim 36, wherein said calling an active content component comprises calling an ActiveX® control.

41. One or more computer-readable storage media as recited in claim 36, further comprising responding to directional control inputs from a user to tab among the first and second focus targets.

42. One or more computer-readable storage media containing instructions that are executable by a computer to implement a visual browser that performs actions comprising:

displaying first visual content having one or more first focus targets;

calling an active content component to generate second visual content having second focus targets within the first visual content;

tabbing a focus among the first focus targets in response to directional control inputs from a user;

calling one or more active content interfaces of the active content component to transfer responsibility for focus tabbing to the active content component;

in conjunction with calling the one or more active content interfaces, providing inbound focus movement descriptors to the active content component, the inbound focus movement descriptors allowing the active content component to determine which of its second focus targets to initially assign the focus.

43. One or more computer-readable storage media as recited in claim 42, wherein the one or more inbound focus movement descriptors comprise a directional indicator indicating a direction in which the focus is being transferred to the active content component.

44. One or more computer-readable storage media as recited in claim 42, wherein the one or more inbound focus movement descriptors comprise a positional indicator indicating a position from which the focus is being transferred to the active content component.

45. One or more computer-readable storage media as recited in claim 42, wherein the one or more inbound focus movement descriptors comprise:

a directional indicator indicating a direction in which the focus is being transferred to the active content component; and a positional indicator indicating a position from which the focus is being transferred to the active content component.

46. One or more computer-readable storage media as recited in claim 42, wherein the one or more inbound focus movement descriptors comprise a designation of a particular one of the second focus targets that is to initially be assigned the focus.

47. One or more computer-readable storage media as recited in claim 42, the actions further comprising exposing one or more browser interfaces that the active content component can call to transfer responsibility for focus tabbing back to the visual browser,wherein the one or more browser interfaces accept one or more outbound focus movement descriptors, the visual browser being responsive to the one or more outbound focus movement descriptors to determine which of its first focus targets to assign the focus.

48. One or more computer-readable storage media as recited in claim 47, wherein the one or more outbound focus movement descriptors comprise a directional indicator indicating a direction in which the focus is being transferred.

49. One or more computer-readable storage media as recited in claim 47, wherein the one or more outbound focus movement descriptors comprise a positional indicator indicating a position from which the focus is being transferred.

50. One or more computer-readable storage media as recited in claim 47, wherein the one or more outbound focus movement descriptors comprise:

a directional indicator indicating a direction in which the focus is being transferred; and a positional indicator indicating a position from which the focus is being transferred.

51. One or more computer-readable storage media as recited in claim 42, the actions further comprising exposing one or more browser interfaces that the active content component can call when tabbing the focus to one of its second focus targets.

52. One or more computer-readable storage media as recited in claim 42, wherein the first visual content is defined by a text markup language.

53. One or more computer-readable storage media as recited in claim 42, wherein calling the active content component comprises calling an ActiveX® control.

54. One or more computer-readable media containing instructions that are executable by a computer to implement an application programming interface for an active content component, the application programming interface having methods comprising:
   a target identification method that is callable to return locations of focus targets within visual content generated by the active content component;
   a set focus method that is callable to assign a focus to a specified one of the focus targets;
   a remove focus method that is callable un-assign the focus;
   a get focus method that is callable to identify a particular one of the focus targets which has been assigned the focus;
   an inbound focus method that is callable to transfer responsibility for focus tabbing to the active content component, wherein the inbound focus method accepts one or more inbound focus movement arguments.

55. One or more computer-readable media as recited in claim 54, the application programming interface methods further comprising a get capabilities method that is callable to inspect capabilities of the active content component.

56. One or more computer-readable media as recited in claim 54, wherein the one or more inbound focus movement arguments comprise a directional indicator indicating a direction in which the focus is being transferred into the active content component.

57. One or more computer-readable as recited in claim 54, wherein the one or more inbound focus movement arguments comprise a positional indicator indicating a position from which the focus is being transferred into the active content component.

58. One or more computer-readable media as recited in claim 54, wherein the one or more inbound focus movement arguments comprise:
   a directional indicator indicating a direction in which the focus is being transferred into the active content component; and
   a positional indicator indicating a position from which the focus is being transferred into the active content component.

59. One or more computer-readable media containing instructions that are executable by a computer to implement an application programming interface for an active content component as recited in claim 54, the active content component being configured to perform actions comprising:
   tabbing the focus among the focus targets;
   calling one or more container interfaces to transfer responsibility for focus tabbing from the active content component;
   in conjunction with calling the one or more container interfaces, specifying one or more outbound focus movement arguments.

60. One or more computer-readable media as recited in claim 59, wherein the one or more outbound focus movement arguments comprise a directional indicator indicating a direction in which the focus is being transferred from the active content component.

61. One or more computer-readable as recited in claim 59, wherein the one or more outbound focus movement arguments comprise a positional indicator indicating a position from which the focus is being transferred from the active content component.

62. One or more computer-readable media as recited in claim 59, wherein the one or more outbound focus movement arguments comprise:
   a directional indicator indicating a direction in which the focus is being transferred from the active content component; and
   a positional indicator indicating a position from which the focus is being transferred from the active content component.

63. One or more computer-readable media containing instructions that are executable by a computer to implement an application programming interface for a visual browser component for use in conjunction with an active visual component, the application programming interface having methods comprising:
   a focus changed method that is callable by the active visual component to indicate a location of a focus target within the active visual component that has been assigned a focus;
   an outbound focus method that is callable to transfer responsibility for tabbing a focus from the active visual component to the visual browser component, wherein the outbound focus method accepts one or more outbound focus movement arguments.

64. One or more computer-readable media as recited in claim 63, the application programming interface methods further comprising a status changed method that is callable by the active visual component to notify the browser of a change within the active visual component regarding its ability to be responsible for focus movement.

65. One or more computer-readable media as recited in claim 63, wherein the one or more outbound focus movement arguments comprise a directional indicator indicating a direction in which the focus is being transferred from the active visual component.

66. One or more computer-readable as recited in claim 63, wherein the one or more outbound focus movement arguments comprise a positional indicator indicating a position from which the focus is being transferred from the active visual component.

67. One or more computer-readable media as recited in claim 63, wherein the one or more outbound focus movement arguments comprise:
   a directional indicator indicating a direction in which the focus is being transferred from the active visual component; and
   a positional indicator indicating a position from which the focus is being transferred from the active visual component.

68. One or more computer-readable media containing instructions that are executable by a computer to implement an application programming interface for a visual browser component as recited in claim 63, the a visual browser component being configured to perform actions comprising:
   tabbing the focus among focus targets displayed by the visual browser;
   calling one or more content interfaces of the active visual content to transfer responsibility for tabbing the focus to the active visual content;
   in conjunction with calling the one or more content interfaces, specifying one or more inbound focus movement arguments.

69. One or more computer-readable media as recited in claim 68, wherein the one or more inbound focus movement arguments comprise a directional indicator indicating a direction in which the focus is being transferred to the active visual component.

70. One or more computer-readable as recited in claim 68, wherein the one or more inbound focus movement arguments comprise a positional indicator indicating a position from which the focus is being transferred to the active visual component.

71. One or more computer-readable media as recited in claim 68, wherein the one or more inbound focus movement arguments comprise:
   a directional indicator indicating a direction in which the focus is being transferred to the active visual component; and
   a positional indicator indicating a position from which the focus is being transferred to the active visual component.

* * * * *